May 5, 1942.　　　J. T. CATLETT　　　2,282,032
METHOD OF SEAM WELDING
Filed Jan. 27, 1940
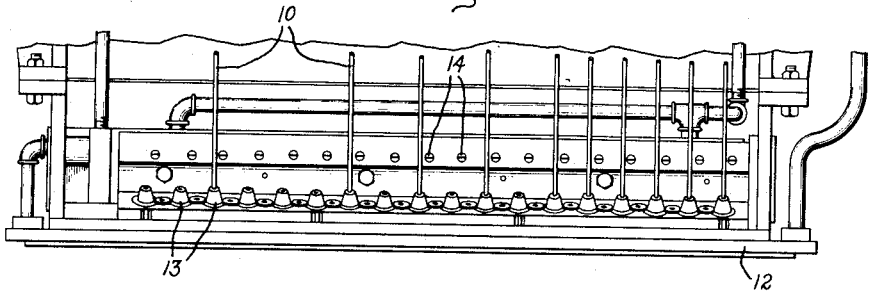
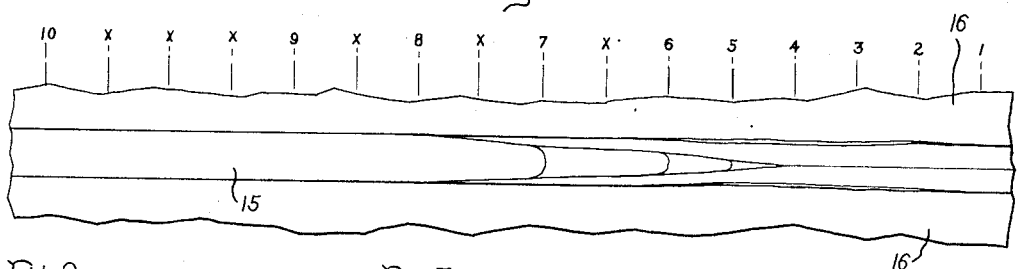
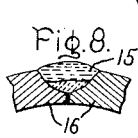
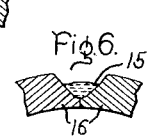
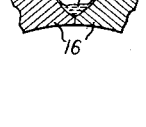
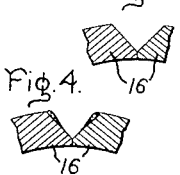
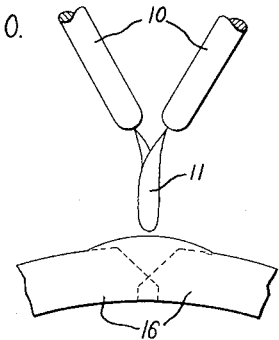
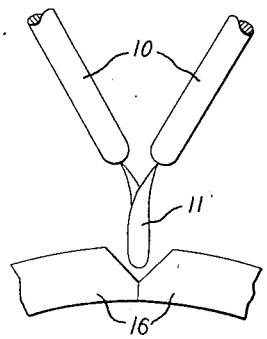
Inventor:
James T. Catlett,
by Harry E. Dunham
His Attorney.

Patented May 5, 1942

2,282,032

UNITED STATES PATENT OFFICE 2,282,032

METHOD OF SEAM WELDING

James T. Catlett, Scotia, N. Y., assignor to General Electric Company, a corporation of New York Application January 27, 1940, Serial No. 315,996

3 Claims. (Cl. 113—112)

My invention relates to seam welding.

It is an object of my invention to provide an improved method of welding in which a plurality of heat producing means arranged in a row along the line of welding are suitably controlled and spaced from one another to produce between plates of substantial thickness a weld which is free from slag and gas pockets.

It is a further object of my invention to control the rate at which heat is applied to the seam in raising it to a welding temperature so that the molten metal produced will not boil violently enough to produce an excessive accumulation of spatter on the arcing terminals of electrodes or on the tips of nozzles which alone or in combination may be used as the heat producing means.

Further objects of my invention will become apparent from the following description thereof.

Although the plurality of heat producing means employed in performing my method of welding may comprise a multi-arc or multi-gas jet welding apparatus, I prefer to employ a multi-arc atomic hydrogen torch such as disclosed and claimed in my copending application Serial No. 315,995 for Welding apparatus, filed concurrently herewith and assigned to the same assignee as the present invention.

The formation of a weld in accordance with my method of welding is illustrated in the accompanying drawing. Fig. 1 of this drawing shows a side view of the nozzle portion of the atomic hydrogen welding torch disclosed and claimed in my above identified application and one arrangement of electrodes therein suitable for performing my method of welding. Fig. 2 is a plan view of a seam being welded by the torch of Fig. 1 and shows the formation of the elongated pool of molten metal in the seam as a result of the arrangement of electrodes shown in Fig. 1. In Fig. 2 the position of each pair of electrodes of Fig. 1 is shown by numerals 1 to 10 and the spaces between pairs of electrodes by one or more x's. Figs. 3 to 9 inclusive located immediately below positions 1, 2, 5, 7, 8, 9, and 10 of Fig. 2 illustrate cross sections of the seam of Fig. 2 at these positions and show the progressive formation of a weld between the seam edges. Figs. 10 and 11 are end views of the seam before and after welding. They also illustrate the nature and location of the welding arc established between pairs of electrodes at positions 1 and 10 of Fig. 2. The dotted lines of Fig. 10 indicate the amount of upset resulting from side pressure on the seam during formation of the weld between positions 1 and 10 of Fig. 2.

The torch disclosed in my above-identified application and partly shown in Fig. 1 of the drawing comprises a plurality of identical electrode holding and feeding means which may be supported in two rows in a plurality of positions, an electrode holding and feeding means in one row being inclined to and paired with an electrode holding and feeding means in the other row so that pairs of electrodes 10 of Figs. 1, 10 and 11 in said pairs of electrode holding and feeding means converge into arcing relationship with one another along the line of welding. In this torch, ten pairs of electrode holding and feeding mechanisms may be supported in eighteen positions to position ten arcs at varying intervals along the seam to vary the heat distribution. One arrangement of the electrodes 10 in each row is shown in Fig. 1 of the drawing. Pairs of electrodes in said pairs of electrode holding and feeding means are preferably arranged in different planes, each of which is perpendicular to the line of welding but displaced from the other a sufficient distance, to stabilize the arc 11 shown in Figs. 10 and 11 and cause it to lie in a plane approximately coinciding with the line of welding as disclosed and claimed in my United States Letters Patent No. 1,946,305, granted February 6, 1934, for Welding apparatus. Each of the electrode holding and feeding mechanisms of one of said pairs is operated by an electric motor, which, in response to the arc voltage between a pair of electrodes supported by a pair of electrode holding and feeding mechanisms, moves the electrodes up and down simultaneously to establish and maintain an arc of desired voltage between the electrodes. The pairs of electrodes extend through a water-cooled nozzle 12 from which they are insulated by mica bushings 13. The nozzle is constructed so as to distribute hydrogen or a hydrogen-containing mixture across the arcing terminals of the pairs of electrodes where it is dissociated to form atomic hydrogen which is directed onto and heats the seam to be welded. The flow of gas around each electrode may be adjusted by a valve 14 easily accessible from the side of the welding head.

The amount of atomic hydrogen generated by each of the arcs in a torch such as above generally described depends on its current and voltage. If an arc is operated at high current values a large amount of atomic hydrogen is formed and greater weld penetration obtained. The arc voltage determines the size of the arc and consequently the heat derived therefrom through the generation of atomic hydrogen. An increase in the arc voltage in addition to increasing the total amount of heat generated changes the heat distribution by lowering the fringe of the arc where the generation of atomic hydrogen is greatest. Thus by changing the voltage of the arc, an effect is obtained which is similar to raising or lowering the welding head. Thus by raising, lowering or tilting the welding head, controlling the arc voltage of successive arcs and the current values of said arcs, the heat distribution along the seam may be controlled. The positions of the arcs in Figs. 10 and 11 show the result of tilting the welding head and controlling arc voltage.

In accordance with my invention, as shown in Figs. 2 to 9 inclusive, the heat distribution along the line of welding is controlled primarily by a suitable spacing of the arcs along the line of welding so that heat is first applied to the seam as rapidly as possible until an elongated pool of molten metal 15 begins to form at about position 4 of Fig. 2, then at a more gradual rate commensurate with the decreased thermal conductivity of the molten metal formed until the non-molten edges of the seam below the pool have been raised to a forge welding temperature at positions 7 or 8 of Fig. 2, and finally at a rate and abutting lip edges of sufficient thickness to retain molten metal in the seam while said lip edges are being heated to a forging temperature. For plates from ¼" to ½" in thickness, the lip edges are from 3/32" to ⅛" in thickness at their abutting surfaces. When welding such a Y seam in accordance with my invention, a side pressure is applied to the seam which progressively brings the opposed surfaces at the bottom of the seam into engagement with one another as in Figs. 3 and 11 before the formation of the above referred-to molten pool, then completes a forge weld between the abutting portions of the seam as in Figs. 7, 8 and 9 while upsetting them sufficiently to fill the V portion of the seam with the molten metal as in Figs. 8, 9 and 11, and finally holds the edges of the seam securely until the weld thus produced becomes strong enough to withstand the stresses resulting from a welding operation. The amount of upset is shown by the dotted lines in Fig. 10.

One application of my method of welding to tube blanks of high carbon steel (.35%) of about .330 inch in thickness having their seams prepared in the manner above described is given in the following table which applies to the arrangement illustrated in the drawing:

| | Direction of tube travel | | | | | | | | | | | | | | | | | | |
|---|---|---|---|---|---|---|---|---|---|---|---|---|---|---|---|---|---|---|
| Location | 1 | 2 | 3 | 4 | 5 | 6 | 7 | 8 | 9 | 10 | 11 | 12 | 13 | 14 | 15 | 16 | 17 | 18 |
| Arc number | 1 | 2 | 3 | 4 | 5 | 6 | | 7 | | 8 | | 9 | | | | 10 | | |
| Current | 150 | 150 | 150 | 150 | 150 | 150 | | 150 | | 150 | | 150 | | | | 140 | | |
| Volts | 100 | 100 | 100 | 90 | 90 | 90 | | 80 | | 80 | | 80 | | | | 80 | | |

Difference in elevation between first and last arc, ½ inch.

which permits the trailing end of the pool of molten metal to solidify progressively from the bottom upwardly as between positions 9 and 10 of Fig. 2 allowing entrapped gasses and slag to escape through the molten portions of the pool. The different sectioning in Figs. 8 and 9 are intended to show this progressive solidification of the weld metal and the molten metal still at the top of the weld.

Generally, the first few arcs of the torch are operated at a high voltage and high current value and are closely spaced together until the leading edge of an elongated pool of molten metal begins to form in the seam. This has been shown in the drawing where the first five pairs of electrodes and the arcs between them are closely spaced. Thereafter the remaining arcs are more widely spaced as shown in the drawing and sometimes operated at a decreased voltage and current so that the rate at which heat is supplied to the seam will not be sufficient to cause appreciable boiling of the molten metal formed. If violent boiling of this pool of molten metal does occur, excessive spatter is formed which accumulates on the electrodes and nozzle of the torch interfering with the efficient operation thereof. Furthermore, if the rate at which heat is applied to the seam through the pool of molten metal is such as to cause this pool to boil, heat is not applied economically to the seam for the heat that can be absorbed by the seam is limited by the thermal conductivity of the material therein which decreases with the formation of more and more molten metal in the seam.

When welding in accordance with my method, the plate edges 16 are preferably bevelled as shown in Figs. 2, 3, and 11 to form a V-groove with an included angle of between 80° and 90°

As previously stated, the spacing of the arcs along the line of welding is such that the arcs in the first group are closely spaced and cause a pool of molten metal to form. The succeeding arcs are then spaced so as to keep the metal molten without excessive boiling while raising the bottom of the seam located below the pool to a forge welding temperature. The final group of arcs controls the cooling of the molten metal in the seam so that solidification progresses upwardly allowing gas and slag to escape from the weld. The spacing indicated in the above table and shown in the drawing is primarily responsible for accomplishing these results. It will also be noted that the current and voltage values of the arcs are also adjusted for securing a finer adjustment than it is possible to obtain by spacing alone and that the difference in elevation between the first and last arc is a half-inch as shown by Figs. 10 and 11.

The manner in which side pressure is exerted on the seam during welding is important. The side pressure exerted prior to the time the tube passes under the first arc ordinarily should be sufficient to close the seam opening as shown in Fig. 3 so that the straight edges below the bottom of the V are in contact. As the tube passes under succeeding arcs, the side pressure should increase gradually upsetting the edges and closing the V so that the molten metal formed in the seam entirely fills the remaining groove as shown in Figs. 9 and 10. When welding stock such as referred to, the upsetting will be about ⅛ inch. Following the final arc the pressure should be sufficient to hold the seam securely during the time necessary to complete the solidification of the molten pool and for the temperature to drop low enough for the welded material to regain the strength necessary to withstand the stresses resulting from the welding operation.

With the adjustments given in the above table, tube blanks formed of plates of the composition and edge preparation given above were welded with 100 per cent penetration, at 65 inches per minute. The quality of the weld was such that the welded tubes could be punched and expanded at their central portions and shaped at their end portions to form rear axle housings without having the weld fail during the forming operation.

It is, of course, apparent that various other groupings of arcs in the multi-arc atomic hydrogen torch above described may be employed without departing from my invention. Instead of using arc positions:

1—2—3—4—5—6—X—7—X—
                  8—X—9—X—X—X—10 such as given in the above table, the following arc positions may be successfully employed:

1—2—3—4—5—X—6—X—
                  7—X—X—8—X—X—9—10

1—2—3—4—5—6—7—X—8—9—X—X—X—10

Other adjustments and arrangements are possible in accordance with my invention which, of course, is not limited to a multi-arc hydrogen torch such as referred to above since multi-arc welding heads, multi-jet gas welding heads, or a plurality single arc or single jet heads may be used in practicing my invention. It is also apparent that various edge preparations of the seam may be employed without departing from my invention.

What I claim as new and desire to secure by Letters Patent of the United States is:

1. The method of seam welding which comprises progressively applying heat along a Y seam as rapidly as possible until the leading end of an elongated pool of molten metal begins to form in the seam, then at a less rapid rate to transmit heat through said pool of molten metal until the non-molten edges of said seam below said pool have been raised to a forge welding temperature, and finally at a still less rapid rate which permits the trailing end of said pool to solidify from its bottom upwardly and while thus applying heat applying a side pressure to said seam which progressively brings opposed surfaces at its bottom into engagement with one another before the formation of said pool, then completes a forge weld between said bottom surfaces with sufficient deformation of the seam edges to fill the top portion of said seam with said molten metal and finally holds said seam securely during the time necessary for the welded portions to become strong enough to withstand the stresses resulting from the welding operation.

2. The method of seam welding which comprises progressively applying heat along a Y seam to be welded as rapidly as possible until the leading end of an elongated pool of molten metal begins to form in the seam, then at a less rapid rate such that said pool of molten metal is not raised substantially above its boiling temperature while the bottom portion of said seam is raised to a forge welding temperature by heat transmitted through said pool of molten metal and finally at a still less rapid rate such that the trailing end of said pool of molten metal solidifies progressively from the forge welded portion of said seam upwardly allowing entrapped gases to escape through the top surface of said pool and while thus applying heat applying to said seam a side pressure which progressively brings opposed surfaces at its bottom into engagement with one another prior to the formation of said pool, then completes a forge weld between said bottom surfaces with sufficient deformation of the seam edges to fill the top portion of said seam with said molten metal and finally holds said seam together while said molten metal in the seam solidifies and the weld thus produced becomes strong enough to withstand the stresses resulting from the welding operation.

3. The method of seam welding which comprises preparing a seam between plates by bevelling the edges of said plates to form a V-groove with an included angle of between 80° and 90° and abutting lip edges of sufficient thickness to retain molten metal in said V-groove while said lip edges are being raised to a forging temperature by heat transmitted through said molten metal, progressively applying heat to said seam as rapidly as possible until the leading end of an elongated pool of molten metal begins to form in said V-groove, then at a less rapid rate so that said pool of molten metal is not raised substantially above its boiling temperature while the abutting lip edges below said pool have been raised to a forge welding temperature, and finally at a still less rapid rate which permits the molten metal in the trailing end of said pool to solidify from the bottom upwardly, and applying a side pressure to the seam which progressively brings the abutting lip edges at the bottom of said seam into engagement with one another before the formation of said molten pool, then completes a forge weld between said abutting lip edges while upsetting the seam edges sufficiently to fill said V-groove with said molten metal and finally holds the plate edges securely until the weld thus produced becomes strong enough to withstand the stresses resulting from the welding operation.

JAMES T. CATLETT.